United States Patent
Mawhinney et al.

(10) Patent No.: US 6,826,620 B1
(45) Date of Patent: Nov. 30, 2004

(54) NETWORK CONGESTION CONTROL SYSTEM AND METHOD

(75) Inventors: Ted Nodine Mawhinney, Clearwater, FL (US); Jeffrey Don Davis, Indian Rocks, FL (US)

(73) Assignee: Paradyne Corporation, Largo, FL (US)

( * ) Notice: Subject to any disclaimer, the term of this patent is extended or adjusted under 35 U.S.C. 154(b) by 750 days.

(21) Appl. No.: 09/304,188

(22) Filed: May 3, 1999

Related U.S. Application Data

(60) Provisional application No. 60/098,186, filed on Aug. 26, 1998.

(51) Int. Cl.[7] .............................................. G06F 15/16
(52) U.S. Cl. ........................ 709/235; 709/234; 370/235
(58) Field of Search ................................. 709/235, 224, 709/234; 370/230, 232, 236, 235, 237

(56) References Cited

U.S. PATENT DOCUMENTS

| | | | | |
|---|---|---|---|---|
| 5,307,484 A | * | 4/1994 | Baker et al. ................. | 707/102 |
| 5,313,454 A | * | 5/1994 | Bustini et al. ................ | 370/13 |
| 5,367,523 A | * | 11/1994 | Chang et al. ................ | 370/235 |
| 5,729,528 A | * | 3/1998 | Salingre et al. ............. | 370/230 |
| 5,768,271 A | * | 6/1998 | Seid et al. ................... | 370/389 |
| 5,802,287 A | * | 9/1998 | Rostoker et al. ............. | 709/250 |
| 5,835,484 A | * | 11/1998 | Yamato et al. ............... | 370/230 |
| 5,898,669 A | * | 4/1999 | Shimony et al. ............. | 370/232 |
| 6,097,697 A | * | 8/2000 | Yao et al. .................... | 370/230 |
| 6,160,793 A | * | 12/2000 | Ghani et al. ................. | 370/236 |
| 6,178,448 B1 | * | 1/2001 | Gray et al. .................. | 709/224 |
| 6,208,650 B1 | * | 3/2001 | Hassell et al. ............... | 370/392 |

\* cited by examiner

*Primary Examiner*—Frantz B. Jean
(74) *Attorney, Agent, or Firm*—Thomas, Kayden, Horstemeyer & Risley LLP

(57) ABSTRACT

A network congestion control system and method facilitate the transmission of information on a communication network by monitoring the data streams coming out of the communication network for congestion notifications, and actively rate controlling the end user application sessions based on such congestion notifications to alleviate the network congestion. This provides congestion control for the network and can be used to avoid congestion reaching the point where the network has to discard data. The end user sessions can be divided into mission critical sessions and non-mission critical sessions. These session types can be prioritized so that non-mission critical sessions are rate controlled during periods of congestion, while mission critical sessions remain unaffected. Mission critical sessions are effectively reserved a specific amount of bandwidth with the rest of the available bandwidth (up to the congestion point) being allocated dynamically to the non-mission critical sessions.

19 Claims, 6 Drawing Sheets

NETWORK CONGESTION CONTROL SYSTEM AND METHOD

CROSS REFERENCE TO RELATED APPLICATIONS

This application claims priority to and the benefit of the filing date of co-pending and commonly assigned provisional application entitled METHOD FOR CONGESTION CONTROL IN FRAME RELAY NETWORKS BY APPLYING ENDPOINT RATE PACING AT THE POINT OF INGRESS OR EGRESS, assigned Ser. No. 60/098,186, filed Aug. 26, 1998, and hereby incorporated by reference.

TECHNICAL FIELD

The present invention is generally related to communication networks, and more particularly, to a system and method for allowing a device located at the ingress/egress point of a communication network to monitor congestion notifications at the data link layer of the communication network, and to proactively control the transmission rate of the end user device that is causing such congestion.

BACKGROUND OF THE INVENTION

Historically, in the field of data communications, modems, data service units (DSU), and channel service units (CSU) have been used to convey information from one location to another. Digital technology now enables modems and other communication devices, such as frame relay data service units (DSU's) and frame relay access units (FRAU's) to communicate large amounts of data at higher speeds. The communication scheme employed by these devices generally adheres to a model, known as the Open Systems Interconnect (OSI) seven-layer model. This model specifies the parameters and conditions under which information is formatted and transferred over a given communications network. A general background of the OSI seven-layer model follows.

In 1978, a framework of international standards for computer network architecture known as "OSI" (Open Systems Interconnect) was developed. The OSI reference model of network architecture consists of seven layers. From the lowest to the highest, the layers are: (1) the physical layer; (2) the data link layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the data link layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the data link layer, and it is used by the transport layer. An example of the network layer is the Internet Protocol (IP), which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

Layer 4, the transport layer, determines how the network layer should be used to provide a point-to-point, virtual, error-free connection so that the end user devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

The communications networks that operate within the OSI seven-layer model include a number of paths or links that are interconnected to route voice, video, and/or digital data (hereinafter, collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a "circuit-switching network". Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, and then demultiplexed at the destination switching facility, and finally delivered to the proper destination node. A variety of techniques for efficiently multiplexing data from multiple source nodes onto a single circuit of the network are presently employed in private line networks. For instance, time division multiplexing (TDM) affords each source node full access to the allotted bandwidth of the circuit for a small amount of time. The circuit is divided into defined time segments, with each segment corresponding to a specific source node, to provide for the transfer of data from those source nodes, when called upon, through the network.

Another type of network is conventionally referred to as a "packet-switching network." Frame relay networks are one implementation of a packet-switching network. Packet-switching networks, as opposed to circuit-switching networks, allow multiple users to share data network facilities and bandwidth, rather than providing a specific amount of dedicated bandwidth to each user, as in TDM. Instead, packet switches divide bandwidth into connectionless, virtual circuits. Virtual circuits can be permanent virtual circuits (PVC's) or switched virtual circuits (SVC's). As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay generally operates within layer 2 (the data link layer) of the OSI model, and is an improvement over previous packet switching techniques, such as the industry standard X.25, in that frame relay requires significantly less overhead.

In frame relay networks, as in all communication networks, access to the network is provided by a network service provider. These service providers generally provide the communication and switching facilities over which the above-mentioned communication devices operate. Typically, an end user desirous of establishing a communications network provisions the network services in the form of a public switched service network. An example of a public switched network is the public switched telephone network (PSTN) or a public data network (PDN). These public networks typically sell network services, in the form of connectivity, to end users.

Typically a user of a public network will purchase a particular level of service from the network service provider. This level of service can be measured by, for example, network availability as a percentage of total time on the network, the amount of data actually delivered through the network compared to the amount of data attempted, or possibly the network latency, or the amount of time it takes for a particular communication to traverse the network.

As is generally known, communications among devices in contemporary communication networks generally implicate the lower three to four layers of the OSI model. These include the physical, data link, network, and transport layers. For example, in packet-switched and frame relay technologies, internode communications affect, and are controlled by, the lower three layers (physical, data link, and network). However, the higher level transport layer may be utilized for purposes of error control.

By way of a more particular illustration, networked transmissions on the World Wide Web of the Internet are generally governed by TCP/IP (Transmission Control Protocol/Internet Protocol), which is a family of protocols. The TCP/IP protocols affect the network layer, transport layer, and application layer, but are generally transparent to the remaining layers of the OSI model. Within the network layer, TCP/IP offers a variety of protocols, of which the Internet Protocol (IP) offers the ability to move data between hosts. The remaining protocols offer services to assist IP in its functions. The transport layer provides services that allow one application program on a particular host to communicate with another application program on a remote host. Transmission Control Protocol (TCP) is utilized at the transport layer to effect bi-directional handshaking for the transmission and control of data packets being sent between hosts. The application layer of TCP/IP generally formats data that is to be communicated to a remote host and performs other services that are necessary to accommodate this communication. In summary, the application layer creates data that is passed to the transport layer, which in turn employs transmission control. The transport layer then passes the data/messages to the network layer, which divides the messages into defined, discrete pieces, also called packets. As is known, these packets are further divided into frames at the data link layer and bits at the physical layer for transmission to remote nodes.

With respect to the network layer of the OSI model, the IP provides an unreliable, connectionless method of delivering data from one host to another. It is characterized as unreliable because the method does not guarantee delivery and, in fact, provides no particular sequencing to assure that data packets are received in the order in which they are transmitted. It is referred to as connectionless, because no initialization sequence is necessary in order for one host to connect with another using the IP protocol. Furthermore, each data packet is independent of every other data packet.

Above the network layer is the transport layer, which handles the TCP protocol. While the packet transmission at the network layer is deemed to be unreliable, error and flow control may be implemented at the higher, transport layer. In this regard, TCP is utilized to establish reliable end-to-end transmissions. More particularly, and as is known, TCP places certain handshaking requirements on the transmission of data packets. For each data packet transmitted, an acknowledgment packet must be received. The reception of an acknowledgment informs the transmitting node (that received the acknowledgment) that the packet was successfully received at the other end. Unless an acknowledgment is "piggy-backed" onto a return data packet, the acknowledgment packet is generally very short in length.

Most contemporary communication networks, such as frame relay and asynchronous transfer mode (ATM) networks, provide congestion notification mechanisms to the network user at the point of ingress/egress to the network. Unfortunately, the user equipment at the edge of the network, which is typically a router, generally ignores any congestion notifications since this equipment is normally implementing the network layer and has no ability to control the flow of data at the end user session. The result is that when a user session is sending data at a rate higher than the network can handle, congestion builds within the network until the network starts discarding data. This discarded data is detected by the end user session, typically through the TCP, which responds by slowing the data rate for the session. Since the discarded data must be retransmitted, which adds to the congestion on the network, this is a very inefficient method of providing flow control for a congested communication network.

The following discussion offers an explanation of network congestion with reference to frame relay networks. However, similar mechanisms apply to most other contemporary communication networks, such as ATM. Frame relay networks provide for the transport of information within a "committed" information rate (CIR) as well as allowing for bursts of data above the committed rate, which is called the burst rate (Be). The network makes a best effort to deliver the burst data, as long as there is excess capacity available in the network. When capacity is not available, network congestion can occur, which generally results in information being discarded by the network. To prevent this loss of data from occurring, most communication networks, and frame relay networks in particular, provide "congestion indicators" that are used to notify the end users of the network when data on a particular connection is experiencing congestion. In the case of frame relay, a forward explicit congestion notification (FECN) bit is set on frames arriving from the network to indicate that frames traveling in the same direction as the frame containing the FECN indication are experiencing congestion. The backward explicit congestion notification (BECN) bit is set to indicate that frames traveling in the opposite direction to the frame containing the BECN indication are experiencing congestion.

The theory is that equipment connected to the edge of the network will respond to the congestion indications by reducing the data rate for information being sent to the network. For BECN notifications the equipment receiving the BECNs should reduce the rate of its frame transmissions, while for FECNs the equipment receiving the notification should notify its peer at the far end of the network that the peer should reduce its data rate. The problem is that most of the equipment connected to the edge of contemporary communication networks (e.g., routers) typically ignores any congestion notifications and does not adjust the frame transmission rate. The reason is that since it is rare for end user applications to be resident on the equipment connected to the network, the equipment connected to the network has no means of controlling the data rate for an application's session. For example, routers generally ignore FECNs and BECNs since they are responsible for routing IP packets and have no control over the transmission rate of TCP traffic with end users on hosts elsewhere in the network.

The current state of the art for congestion control is that the congestion notifications are typically ignored, congestion builds within the communication network until the network is forced to start discarding information (frames, cells, etc.), and the end-to-end user application session detects the lost information and reduces the rate of transmission.

One problem associated with current systems is that while some end-point protocols (e.g., TCP) respond to dropped frames by decreasing the rate of transmission, many others either cannot detect dropped frames or do not base the transmission rate on the number of dropped frames. For these applications, network congestion is only relieved when no information remains to be sent.

Another problem with present systems is that because controlling the data transmission rate based on discarded data is a reactive method, nothing is done to relieve the congestion until after the network is already saturated. This results in longer recovery times and inefficient use of the network since the dropped information must be retransmitted. Forcing the end user session to retransmit information increases the load being offered to the network (at least up to the point of the congestion) and may actually increase the level of congestion in the network.

Another method used today that attempts to alleviate congestion for some traffic types is to use some sort of priority queuing at the ingress point of the network. This method allows particular traffic types to be defined and prioritized. While this does not prevent congestion from occurring it does give higher priority traffic a better chance of getting through during periods of congestion. Lower priority traffic is queued until the congestion subsides or until the queues fill up and the traffic has to be discarded. While this method helps for high priority traffic, it still suffers from the shortcoming of being a reactive method, and under periods of heavy congestion it falls back to merely discarding traffic in order to relieve the congestion.

Thus, there is a need in the industry for a system and method to monitor the congestion notifications at the data link layer of a communication network and proactively rate control the end user session(s) to minimize the amount of information that must be discarded due to network congestion.

SUMMARY OF THE INVENTION

The present invention provides a system and method for allowing a device located at the ingress/egress point of a communication network to monitor the congestion notifications at the data link layer of the communication network, and proactively rate control the end user session(s) in response thereto. This is accomplished by having the communication device at the edge of the network: (1) monitor the data streams coming out of the communication network for congestion notifications, and (2) actively rate control the end user application sessions based on such congestion notifications to alleviate the network congestion. This provides congestion control for the network and can be used to avoid congestion reaching the point where the network has to discard data.

Briefly described, this is accomplished by having a communication device at the edge of the network monitor the congestion notifications at the link layer of the network. As an example, a frame relay access unit (FRAU) connected to a frame relay network monitors incoming frames for forward explicit congestion notification (FECN) bits and backward explicit congestion notification (BECN) bits, which indicate not only congestion but the direction that is experiencing congestion. Additionally, the FRAU continuously monitors and tracks the state of the end user session(s) (such as TCP) that are established over the network. When the number of frames received with FECNs/BECNs reaches a particular threshold, the end user session is actively rate controlled by a method suitable for the particular session type. When the congestion is alleviated, indicated by the absence of frames with FECNs or BECNS, the rate controlled end user sessions are gradually increased until they are no longer being rate controlled.

In addition, the end user sessions can be divided into two classes: mission critical sessions and non-mission critical sessions. These session types can be prioritized so that non-mission critical sessions can be rate controlled during periods of network congestion while mission critical sessions remain unaffected. Mission critical sessions are effectively reserved a specific amount of bandwidth with the rest of the available bandwidth (up to the congestion point) being allocated dynamically to the non-mission critical sessions.

An advantage of the invention is that the invention bypasses the need to depend on the equipment connected to a communication network to respond to congestion notification from the network. By monitoring the end user sessions and directly controlling the rate at which the end users send data, the invention creates a direct bridge between the communication network's layer 2 protocols and the end user's layer 4 and above application sessions. This solves a major problem since the end user applications resident on the equipment are not typically connected to the network, and the applications are hence unable to normally respond, or even be aware of, congestion indications from the network.

Another advantage of the invention is that the invention provides the ability to define mission critical data flows and provide a guaranteed data rate that is not affected by network congestion or the current data rate of non-mission critical data flows. This protects mission critical data flows by directly rate controlling non-mission critical data flows that share the same network connection with the mission critical data flows. The data rate of non-mission critical sessions can be actively slowed before it becomes a problem, thus allowing the mission critical data to be transmitted without discarding any of the data due to network congestion.

Other features of the present invention will become apparent to one with skill in the art upon examination of the following drawings and detailed description. It is intended that all such additional features be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
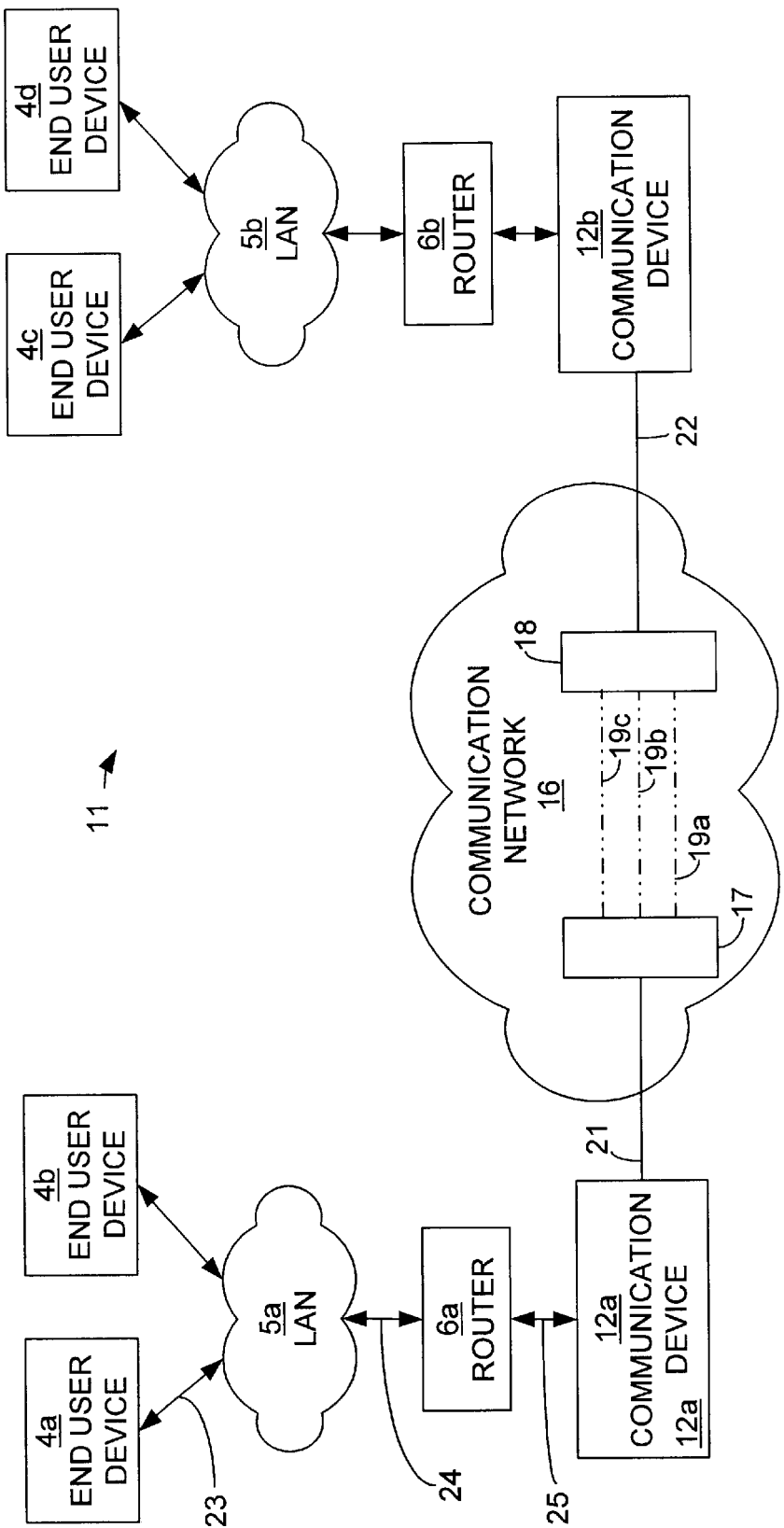
FIG. 1 is a block diagram of a simplified communication environment in which communications devices containing the congestion control logic of the present invention operate.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

The congestion control logic of the present invention can be implemented in software, hardware, or a combination thereof. In a preferred embodiment, the congestion control logic is implemented in software that is stored in a memory and that is executed by a suitable microprocessor (uP) situated in a communications device. However, the congestion control program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Furthermore, the preferred embodiment of the congestion control logic is illustrated in the context of a frame relay communications network; however, the concepts and principles of the congestion control logic are equally applicable to other communication techniques, such as asynchronous transfer mode (ATM) or X.25.

FIG. 1 shows a simplified communication environment 11 in which communications devices containing the congestion control logic operate. In general, the communication environment includes a plurality of end user devices 4a, 4b, 4c, and 4d, a plurality of Local Area Networks (LANs) 5a and 5b, a plurality of routers 6a and 6b, and a plurality of communication devices 12a and 12b. For simplicity only two communication devices are depicted in FIG. 1. In practice, communication environment 11 will typically contain many communication devices. Each of the plurality of end user devices 4a, 4b, 4c and 4d is connected via one of the LANs 5a and 5b and one of the routers 6a and 6b to one of the communication devices 12a and 12b. Illustratively, end user device 4a is connected to LAN 5a over connection 23, LAN 5a is connected to router 6a over connection 24, and router 6a is connected to communication device 12a over connection 25.

In the preferred embodiment, communication devices 12a and 12b are illustratively frame relay access units (FRAU's). FRAU's 12a and 12b communicate over communication network 16 in a conventional manner. Communication network 16 can be for example any public network that provides connectivity for FRAU's 12a and 12b, and in the preferred embodiment is a frame relay communication network. Communication network 16 illustratively connects to FRAU's 12a and 12b over connections 21 and 22, respectively. Connections 21, 22, 23, 24 and 25 can be physical links and can be, for example, T1/E1 service, T3/E3 service, digital data service (DDS), a synchronous data link, or a LAN.

Communication network 16 is typically characterized by a mesh network of links (not shown) interconnecting a matrix of intermediate nodes (not shown) through frame relay switches 17 and 18. For simplicity only two frame relay switches are illustrated herein; however, communication network 16 will typically contain many switching devices. The links are identified by data link connection identifiers (DLCI's), which are used to identify the logical connection over which the subject data is transported. The use of DLCI's allows multiple logical connections to be multiplexed over the same channel. Alternatively, in the case of an asynchronous transfer mode (ATM) network, virtual path identifiers/virtual channel identifiers (VPI's/VCI's) are used to identify the logical connection over which the subject data is transported.

Information is communicated over the communication network 16 in discrete packets, which may be multiplexed across shared or common communication links. For example, FRAU 12a may communicate with FRAU 12b over a predefined communication path or link within the frame relay network. This communication path will generally be defined by a number intermediate nodes. The communication link that interconnects FRAU 12a and FRAU 12b may be completely separate and distinct from the link that interconnects FRAU 12a with other FRAUs (not shown) in the communication environment 11. Alternatively, a segment of the two above-described communication links may be shared. Whether the links are separate or shared is a function of a number of factors, and generally is determined by the service provider.

Within communication network 16 the communication path between FRAU 12a and FRAU 12b, for example, will be the same in both directions. That is, data transmitted from FRAU 12a to FRAU 12b will traverse the same path (i.e., interconnecting, intermediate nodes) as will data transmitted from FRAU 12b to FRAU 12a. This path of intermediate nodes is defined by DLCI's, and is commonly referred to as a permanent virtual circuit (PVC). This name derives from the fact that the circuit is permanent in that it does not change from transmission to transmission. It is, however, virtual in the sense that a unitary physical connection (such as a dedicated leased line) is not established and maintained between the two end users. If for some reason or another the service provider decides to change the interconnecting path (i.e., reconfigure or redefine the intermediate nodes), the service provider will communicate this changed communication path to the users and a new set of DLCI's will be used in order to properly route the data from end user to end user. DLCI's are assigned to and define all the points in a network through which data passes. For simplicity the congestion control logic of the present invention is described herein as applied to permanent virtual circuits (PVC's); however, the congestion control logic of the present invention is equally applicable to communication networks employing switched virtual circuits (SVC's). Still referring to FIG. 1, PVC's 19a, 19b, and 19c illustrate the concept of multiple communication paths within communication network 16.

Figure 2:
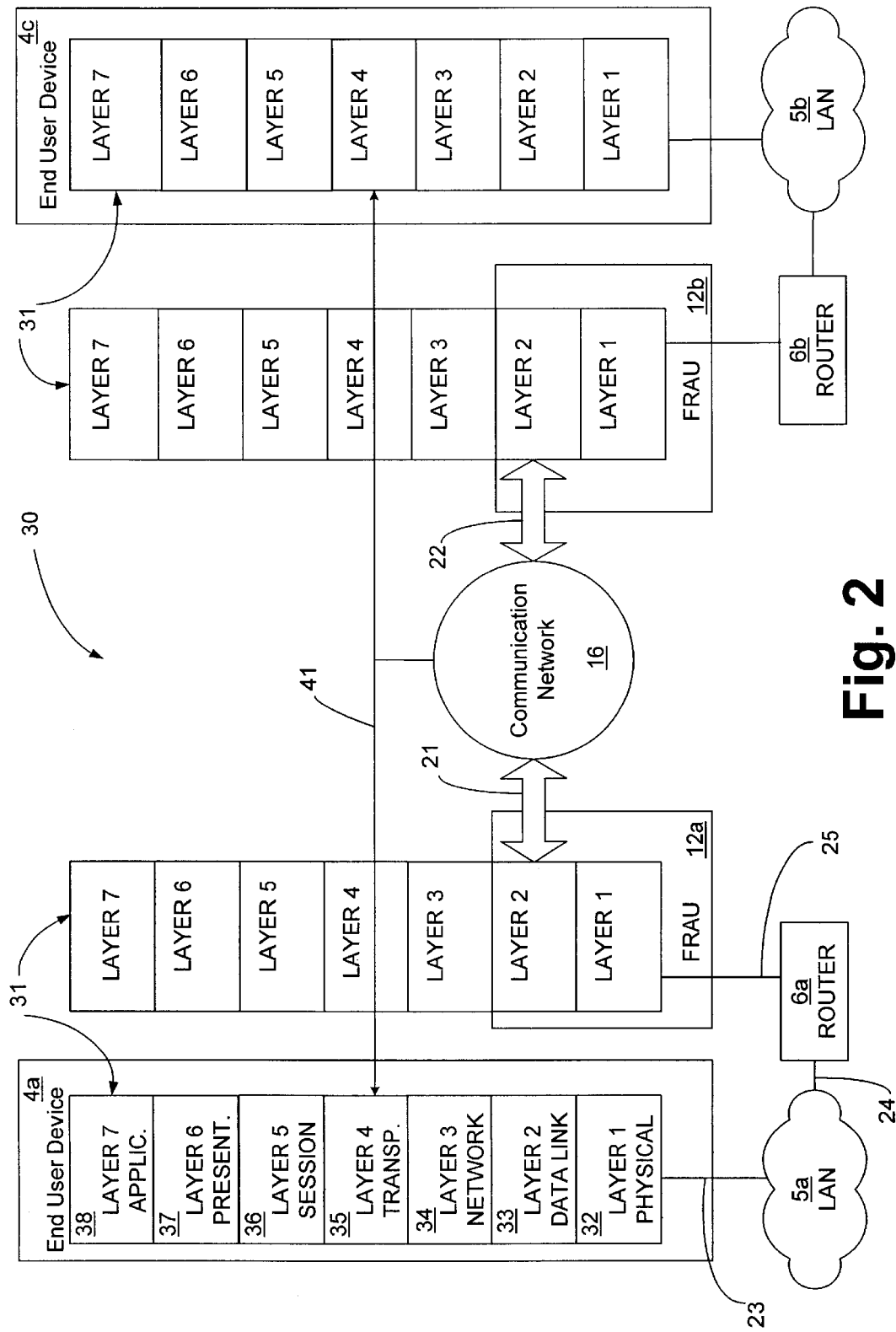
FIG. 2 is a block diagram of a network model illustrating the layers of the OSI seven-layer model in which devices employing the congestion control logic of the present invention operate.

FIG. 2 is a block diagram of a network model illustrating the layers of the OSI seven-layer model in which devices employing the congestion control logic of the present invention operate. As discussed hereinafter with respect to FIG. 3, the congestion control logic of the present invention resides within each communication device 12a and 12b, which is illustratively a FRAU. FRAUs 12a and 12b are typically the devices that connect end user devices 4a and 4c (through LANs 5a and 5b and routers 6a and 6b) to the communication network 16, which is illustratively a frame relay network. FRAUs 12a and 12b typically communicate over frame relay network 16 using layer 2 (the data link layer 33, of the OSI seven-layer model 31). FRAUs 12a and 12b, however, are also aware of layer 1 (the physical layer 32 of the OSI seven-layer model), since FRAUs 12a and 12b each contain a physical layer access device, such as a DSU. The data link layer 33 contains the standards and protocols (including the logical management interface (LMI)) that enable the transport of frame relay data. The physical layer 32 includes the hardware connections and physical media that enable the transport of information over the network.

As explained hereinafter in relation to FIGS. 4A–4C, by monitoring the frame relay network 16 for congestion and directly controlling the rate at which the end user devices 4a and 4c send data in response to congestion in the network, the congestion control logic residing in FRAU 12a creates a direct (virtual) bridge 41 between the frame relay network's 16 data link layer 33 and the end user devices' 4a and 4c use of layers 4–7 of the OSI seven-layer model: the transport layer 35, the session layer 36, the presentation layer 37, and the application layer 38. Bridge 41 can likewise be created by the congestion control logic residing in FRAU 12b.

Figure 3:
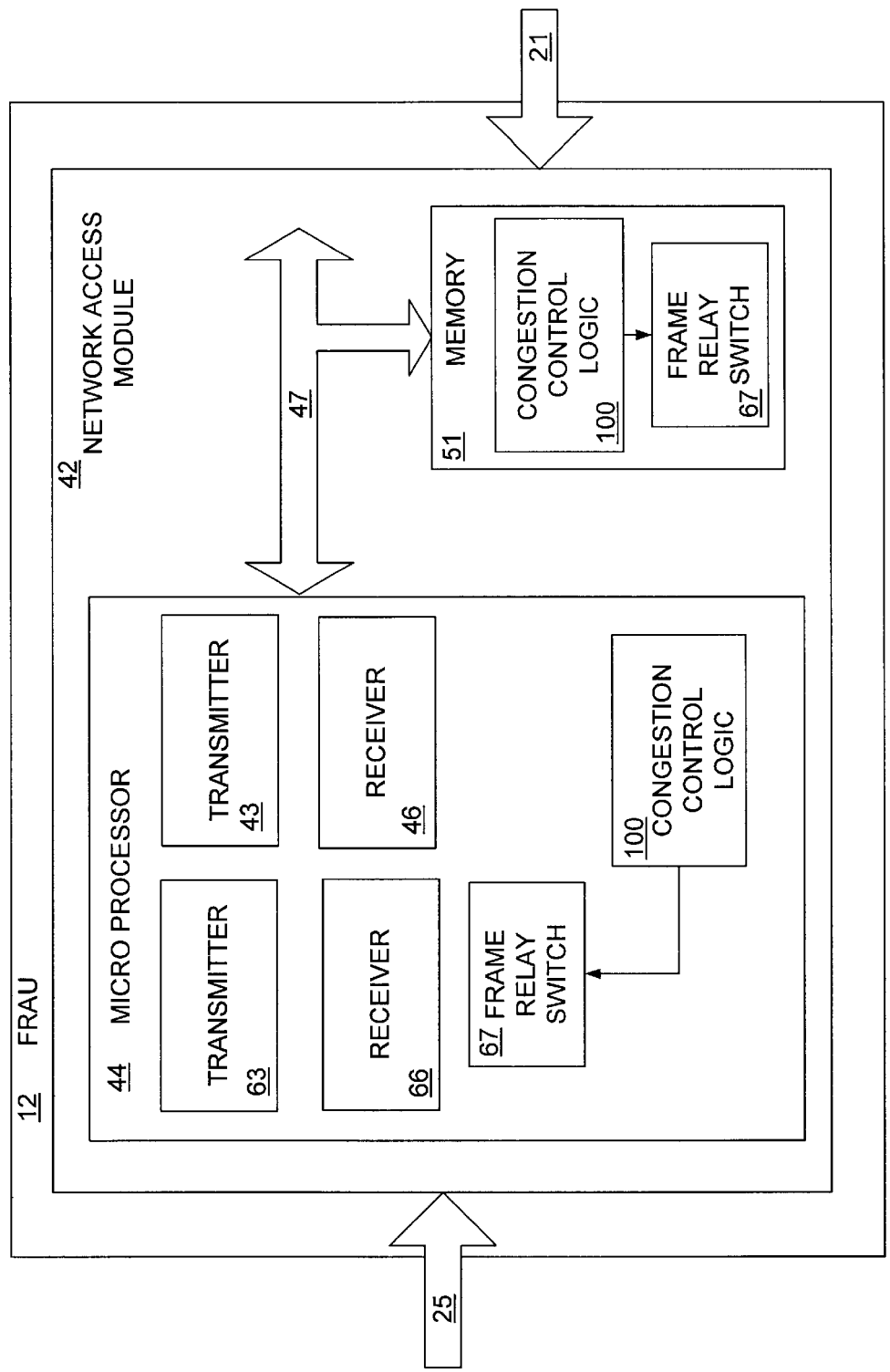
FIG. 3 is a block diagram illustrating a communication device employing the congestion control logic of the present invention.

Referring now to FIG. 3, shown is a schematic view illustrating a communications device, for example but not limited to, a FRAU 12, containing the congestion control logic 100 of the present invention. FRAU 12 contains network access module (NAM) 42, which includes a number of conventional components that are well known in the art of data communications. Microprocessor (uP) 44 is configured to control the operation of the FRAU's transmitters 43 and 63, and receivers 46 and 66, as well as frame relay switch 67. Microprocessor (uP) 44 is also configured to couple to memory 51 over bus 47.

Communication channel 21 is typically the physical wire that extends from a frame relay network and connects to NAM 42 to provide access into the frame relay, or other communication network. However, communication channel 21 can be any medium for connecting the FRAU 12 to a communication network. Communication between the FRAU 12 and communication channel 21 is effected through transmitter 43 and receiver 46.

Likewise, communication channel 25 is typically the physical wire that extends from router 6 to NAM 42 to provide access between FRAU 12 and router 6. However, communication channel 25 can be any medium for connecting the FRAU 12 to router 6. Communication between the FRAU 12 and communication channel 25 is effected through transmitter 63 and receiver 66.

Also included in FRAU 12 is memory 51 which includes the congestion control logic 100 of the present invention and frame relay switch 67. Congestion control logic 100 is configured to enable and drive uP 44 to provide the monitoring and control of network traffic through communication devices 12a and 12b over communication network 16 of FIG. 1. Illustratively, the congestion control logic 100 of the present invention resides in all FRAU's. Because congestion control logic 100 is an algorithm that is executed by uP 44, it is depicted as residing within both memory 51 and uP 44. Similarly, frame relay switch 67 resides in memory 51 and executes in uP 44.

Figure 4A:
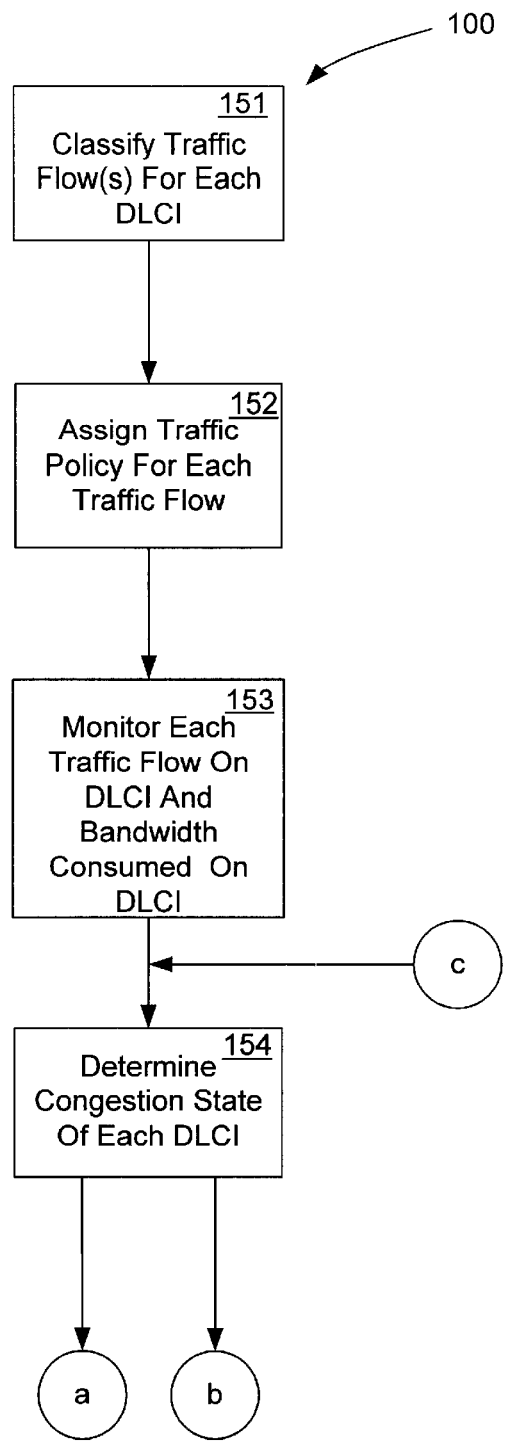
FIGS. 4A, 4B and 4C are flow diagrams illustrating the operation of the congestion control logic of FIG. 3.
Figure 4B:
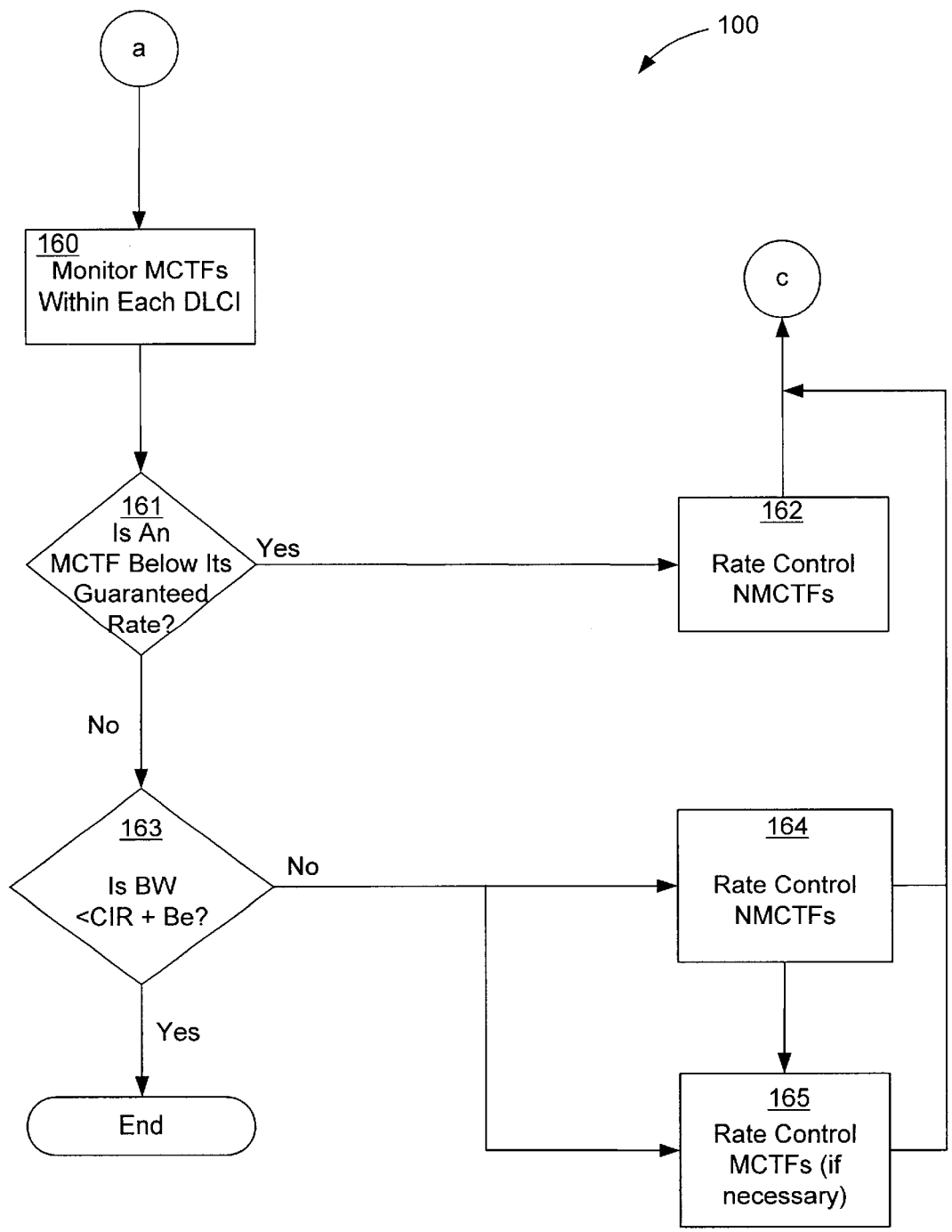
Figure 4C:
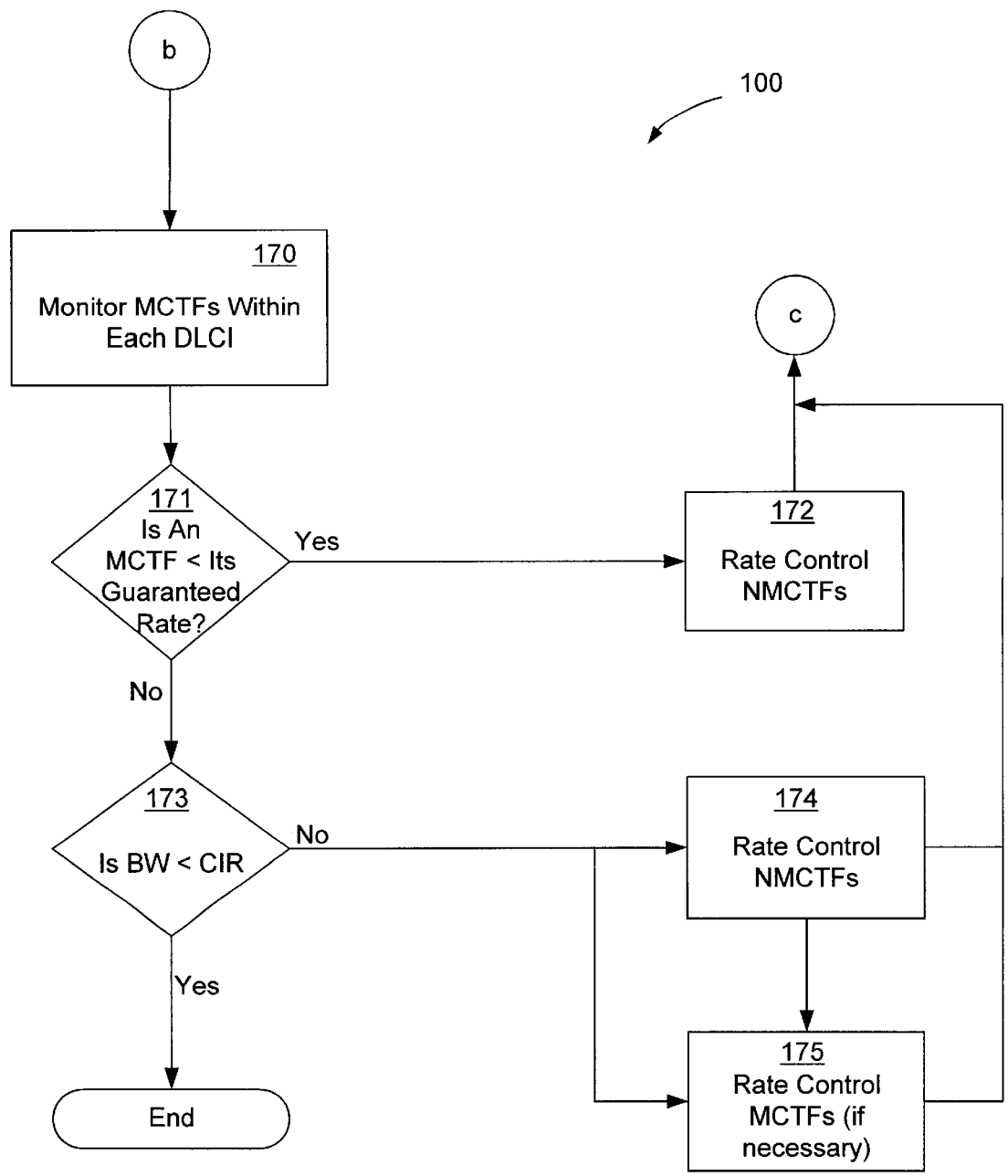

FIGS. 4A, 4B and 4C are flow diagrams illustrating the operation of the congestion control logic 100 of FIG. 3.

With reference to FIG. 4A, in step 151, the traffic flow(s) for each DLCI in the FRAU are classified. Classification may be based on end user protocol, address, and/or application type, and can either be performed dynamically within the FRAU or preconfigured.

After being classified in step 151, the logic proceeds to step 152, in which each traffic flow is assigned a traffic policy and identified as a mission critical traffic flow (MCTF) or a non-mission critical traffic flow (NMCTF). The traffic policy allows guaranteed and maximum data rate limits to be assigned to individual traffic flows. Typically MCTFs are assigned a guaranteed data rate up to the committed information rate (CIR) of the DLCI, while NMCTFs are allowed to utilize a maximum data rate up to the CIR plus the burst excess (Be) rate.

In step 153, the logic simultaneously monitors each traffic flow on each DLCI and the total bandwidth consumed for all traffic flows on each individual DLCI, and in step 154 the logic determines the congestion state of each DLCI on a per-packet basis as packets are received from the router. The congestion state may be determined by any suitable means. As an illustrative example, the congestion state may be determined by monitoring the traffic received on each individual DLCI, and by determining the number of packets received that have the BECN bit set in the packet's header. This bit indicates that there is congestion in the direction the FRAU is transmitting (i.e., the opposite direction to that of the packet with the BECN set). If x number of packets having the BECN bit set are received in y period of time (x & y are implementation specific) the circuit is determined to be congested. On the other hand, if z period of time passes without any BECN packets being received, the circuit is determined to be non-congested.

It should be noted that the detection of congestion may be enhanced by using the procedure disclosed in co-pending, commonly assigned U.S. patent application Ser. No. 09/144, 926, filed Sep. 1, 1998, entitled "SYSTEM AND METHOD FOR THE MEASUREMENT OF SERVICE QUALITY IN A COMMUNICATIONS NETWORK", which is hereby incorporated in this application by reference, to determine the number of dropped packets between the transmitter and the receiver. When a circuit exceeded a threshold of dropped packets per period of time it could be considered congested.

If it is determined in step 154 that a DLCI is not congested, the logic proceeds to step 160, as illustrated in FIG. 4B. In step 160, the logic monitors the MCTFs within each non-congested DLCI to ensure that the MCTFs receive their guaranteed data rate.

In step 161, the logic determines whether an MCTF is below its guaranteed data rate and whether there is traffic to send for the MCTF. If it is determined in step 161 that an MCTF is below its guaranteed data rate and that there is traffic to send for the MCTF, step 162 rate controls the NMCTFs that are sharing the DLCI with the MCTF to decrease the total bandwidth being consumed by the NMCTFs.

The specific method used to rate control an end user device is outside the scope of this invention and may be protocol specific. An example using TCP/IP is given as follows: The FRAU monitors each TCP connection and maintains a TCP state machine. The FRAU controls both the rate of TCP acknowledge packets as well as the TCP window size within the acknowledge packets. The FRAU maintains a real time estimate of the current rate of each TCP connection and uses a combination of pacing the acknowledge packets and/or calculating the TCP window size needed to maintain the desired data rate for the connection. For example, if a TCP connection is currently consuming 28,000 bits-per-second (bps) of bandwidth and the desired total bandwidth is 20,000 bps, the FRAU could send acknowledge packets every 0.1 seconds advertising a 250 byte window size. The TCP transmitter would then transmit at a rate of 20,000 bps.

If the MCTF is receiving its guaranteed data rate, in step 163 the total bandwidth (BW) for the DLCI is measured to ensure that it is less than the CIR plus the Be (i.e., BW<CIR+Be). If the bandwidth for the DLCI is less than CIR+Be, no further adjustments to the data rates are required. However, if the bandwidth measured in step 163 equals or exceeds CIR+Be, the NMCTFs are rate controlled to a slower speed in step 164. If the bandwidth continues to rise, then the MCTFs are rate controlled in step 165 until the bandwidth is reduced to less than CIR+Be. For each DLCI, the total bandwidth used by all non-congested traffic flows is rate controlled such that it does not exceed the circuit's CIR+Be.

If it is determined in step 154 that a DLCI is congested, the logic proceeds to step 170, as illustrated in FIG. 4C. In step 170, the logic monitors the MCTFs within each congested DLCI to ensure that the MCTFs receive their guaranteed data rate.

In step 171, the logic determines whether an MCTF is below its guaranteed data rate and whether there is traffic to send for the MCTF. If it is determined in step 171 that an MCTF is below its guaranteed data rate and that there is traffic to send for the MCTF, step 172 rate controls the NMCTFs that are sharing the DLCI with the MCTF to decrease the total bandwidth being consumed by the NMCTFs.

If the MCTF is receiving its guaranteed data rate, in step 173 the total bandwidth for the DLCI is measured to ensure that it is less than the CIR (i.e., BW<CIR). If the bandwidth for the DLCI is less than CIR, no further adjustments to the data rates are required. However, if the bandwidth measured in step 173 equals or exceeds CIR, the NMCTFs are rate controlled to a slower speed in step 174. If the bandwidth continues to rise, then the MCTFs are rate controlled in step 175 until the bandwidth is reduced to less than CIR. For each DLCI, the total bandwidth used by all congested traffic flows is rate controlled such that it does not exceed the circuit's CIR.

It will be obvious to those skilled in the art that many modifications and variations may be made to the preferred embodiments of the present invention, as set forth above, without departing substantially from the principles of the present invention. For example, the principles of the congestion control system and method detailed herein are equally applicable to other communication services such as, for example but not limited to asynchronous transfer mode (ATM). All such modifications and variations are intended to be included herein within the scope of the present invention, as defined in the claims that follow.

Therefore, having thus described the invention, at least the following is claimed:

1. A method for alleviating congestion in a communication network, the communication network enabling the flow of data to and from a plurality of end user devices that are connected to the network through a plurality of communication devices, the method comprising the steps of:
    monitoring data flows to and from the plurality of end user devices for indications of congestion; and
    controlling the data rate of at least one end user device in response to said congestion indications.

2. The method of claim 1, wherein the communication network is a frame relay network.

3. The method of claim 1, wherein the communication network is an asynchronous transfer mode (ATM) network.

4. The method of claim 1, further comprising the steps of:
    classifying each of said data flows to and from the plurality of end user devices as either mission critical or non-mission critical; and
    controlling the data rate of at least one end user device involved in a non-mission critical data flow.

5. The method of claim 4, further comprising the step of:
    controlling the data rate of at least one end user device involved in a mission critical data flow.

6. A system for alleviating congestion in a communication network, the communication network enabling the flow of data to and from a plurality of end user devices that are connected to the network through a plurality of communication devices, comprising:
    means for monitoring data flows to and from the plurality of end user devices for indications of congestion; and
    means for controlling the data rate of at least one end user device in response to said congestion indications.

7. The system of claim 6, wherein said communication network is a frame relay network.

8. The system of claim 6, wherein said communication network is an asynchronous transfer mode (ATM) network.

9. The system of claim 6, wherein said system is implemented in a communication device connected to the communication network.

10. The system of claim 9, wherein said communication device is a frame relay access unit (FRAU).

11. The system of claim 6, further comprising:

means for classifying each of the data flows to and from the plurality of end user devices as either mission critical or non-mission critical; and means for controlling the data rate of at least one end user device involved in a non-mission critical data flow.

12. The system of claim 11, further comprising:

means for controlling the data rate of at least one end user device involved in a mission critical data flow.

13. A computer readable medium having a program for alleviating congestion in a communication network, the communication network enabling the flow of data to and from a plurality of end user devices that are connected to the network through a plurality of communication devices, comprising:

logic configured to monitor data flows to and from the plurality of end user devices for indications of congestion; and logic configured to control the data rate of at least one end user device in response to said congestion indications.

14. The computer readable medium of claim 13, wherein said communication network is a frame relay network.

15. The computer readable medium of claim 13, wherein said communication network is an asynchronous transfer mode (ATM) network.

16. The computer readable medium of claim 13, wherein said program is executed in a communication device located at the ingress/egress to the communication network.

17. The computer readable medium of claim 16, wherein said communication device is a frame relay access unit (FRAU).

18. The computer readable medium of claim 13, further comprising:

logic configured to classify each of said data flows to and from the plurality of end user devices as either mission critical or non-mission critical; and logic configured to control the data rate of at least one end user device involved in a non-mission critical data flow.

19. The computer readable medium of claim 18, further comprising:

logic configured to control the data rate of at least one end user device involved in a mission critical data flow.

* * * * *